United States Patent
Uszkoreit et al.

(10) Patent No.: US 9,280,970 B1
(45) Date of Patent: Mar. 8, 2016

(54) LATTICE SEMANTIC PARSING

(71) Applicant: Google Inc., Mountain View, CA (US)

(72) Inventors: Jakob D. Uszkoreit, San Francisco, CA (US); Percy Liang, Palo Alto, CA (US); Daniel M. Bikel, Mount Kisco, NY (US)

(73) Assignee: Google Inc., Mountain View, CA (US)

(*) Notice: Subject to any disclaimer, the term of this patent is extended or adjusted under 35 U.S.C. 154(b) by 353 days.

(21) Appl. No.: 13/926,669

(22) Filed: Jun. 25, 2013

(51) Int. Cl.
G10L 15/18 (2013.01)

(52) U.S. Cl.
CPC .................................. *G10L 15/1822* (2013.01)

(58) Field of Classification Search
CPC ....... G10L 15/083; G10L 15/14; G10L 15/18; G10L 15/1822; G10L 15/19; G06F 17/27; G06F 17/2705; G06F 17/271; G06F 17/2765
USPC .............. 704/9, 242, 252, 254, 255, 257, 275
See application file for complete search history.

(56) References Cited

U.S. PATENT DOCUMENTS

| 5,212,821 | A | | 5/1993 | Gorin et al. | |
|---|---|---|---|---|---|
| 5,652,897 | A | * | 7/1997 | Linebarger | G10L 15/1822 704/4 |
| 5,797,123 | A | | 8/1998 | Chou et al. | |
| 5,870,706 | A | * | 2/1999 | Alshawi | 704/255 |
| 6,128,596 | A | * | 10/2000 | Mackie | G10L 15/18 704/257 |
| 6,138,098 | A | * | 10/2000 | Shieber | G10L 15/1822 704/257 |
| 6,182,039 | B1 | * | 1/2001 | Rigazio | G10L 15/193 704/257 |
| 6,397,181 | B1 | * | 5/2002 | Li et al. | 704/256.4 |
| 7,003,444 | B2 | * | 2/2006 | Weise | 704/257 |
| 7,379,870 | B1 | * | 5/2008 | Belvin et al. | 704/255 |
| 7,562,010 | B1 | * | 7/2009 | Gretter et al. | 704/257 |
| 8,041,570 | B2 | * | 10/2011 | Mirkovic et al. | 704/257 |
| 8,682,661 | B1 | * | 3/2014 | Schalkwyk | G10L 15/1815 704/257 |
| 8,924,215 | B2 | * | 12/2014 | Pulz | G10L 15/005 704/257 |
| 8,972,243 | B1 | * | 3/2015 | Strom et al. | 704/231 |
| 9,092,505 | B1 | * | 7/2015 | Uszkoreit et al. | |
| 9,117,452 | B1 | * | 8/2015 | Uszkoreit | G06F 17/2705 |
| 9,123,336 | B1 | * | 9/2015 | Uszkoreit | G06F 17/2705 |
| 9,177,553 | B1 | * | 11/2015 | Uszkoreit | G10L 15/22 |
| 9,183,196 | B1 | * | 11/2015 | Uszkoreit | G06F 17/28 |

(Continued)

FOREIGN PATENT DOCUMENTS

EP 834862 A2 4/1998
WO WO0014727 A1 3/2000

OTHER PUBLICATIONS

Bonino et al., "Dynamic Optimization of Semantic Annotation Relevance" in Evolutionary Computation CEC2004, Congress on Evolutionary Computation, 2004, pp. 1301-1308.

(Continued)

*Primary Examiner* — Martin Lerner
(74) *Attorney, Agent, or Firm* — Fish & Richardson P.C.

(57) ABSTRACT

A language processing system uses a lattice parser that semantically parses a command input represented by a lattice. The parser receives a hypotheses space of outputs as encoded in a lattice. Annotations of the input are projected back into the lattice and then lattice parsing is performed to rectify with the annotations. Parsing rules are applied to path fragments in the lattice. The rules that successfully parse from the start node to the end node of the lattice are used to determine whether the command input sentence invokes a specific action, and if so, what arguments are to be passed to the invocation of the action.

15 Claims, 3 Drawing Sheets

(56) References Cited

U.S. PATENT DOCUMENTS

| | | | | |
|---|---|---|---|---|
| 2002/0165716 | A1* | 11/2002 | Mangu et al. | 704/255 |
| 2006/0116877 | A1* | 6/2006 | Pickering | G10L 15/08 704/231 |
| 2006/0190261 | A1 | 8/2006 | Wang | |
| 2011/0119049 | A1* | 5/2011 | Ylonen | 704/9 |
| 2012/0116768 | A1* | 5/2012 | Bangalore et al. | 704/254 |
| 2012/0290509 | A1 | 11/2012 | Heck et al. | |
| 2012/0296648 | A1* | 11/2012 | Mohri et al. | 704/236 |
| 2013/0132322 | A1* | 5/2013 | Cohen | G06F 17/2705 706/47 |
| 2014/0207451 | A1* | 7/2014 | Topiwala et al. | 704/235 |
| 2014/0310225 | A1* | 10/2014 | Huang | G06F 17/2705 706/48 |

OTHER PUBLICATIONS

Chen et al., "Diverse Topic Phrase Extraction from Text Collection" WWW 2006, 9 pages.

Gorin et al., "An Experiment in Spoken Language Acquisition", IEEE Transactions on Speech and Audio Processing, 2 (1)(II), 1994, pp. 224-240.

Gupta et al., "Segmenting Spoken Language Utterances Into Clauses for Semantic Classification" in Automatic Speech Recognition and Understanding (ASRU 2003), 2003 IEEE Workshop, pp. 525-530.

Kawahara et al., "Topic Independent Language Model for Key-Phrase Detection and Verification", Acoustics, Speech, and Signal Processing, 1999, 1999 IEEE International Conference, pp. 685-688.

Krulwich et al., "Learning user information interests through the extraction of semantically significant phrases" AAAI Technology Report SS-96-05, Compilation, pp. 110-112, (1996).

Lee et al., "Utterance-Level Latent Topic Transition Modeling for Spoken Documents and its Application in Automatic Summarization" in Acoustics, Speech and Signal Processing (ICASSP), 2012 IEEE International Conference, 2012, pp. 5065-5068. [online] [Retrieved on Jan. 31, 2013], Retrieved from the internet: http://www.cs.cmu.edu/~yvchen/doc/ICASSP12_LTModel.pdf.

Lehuen et al., "A Robust Semantic Parser Designed for Spoken Dialog Systems" in 2010 IEEE Fourth International Conference on Semantic Computing (ICSC), 2010, pp. 52-55.

Tur et al., "Semi-Supervised Learning for Spoken Language Understanding Using Semantic Role Labeling" in Automatic Speech Recognition and Understanding (ASRU 2005), pp. 232-237. [online] [Retrieved on Jan. 31, 2013], Retrieved from the internet: http://www.cs.cmu.edu/~ananlada/SennanticRoleLabelingASRU05.pdf.

Wong et al., "Improvements on a Semi-Automatic Grammar Induction Framework" in IEEE Automatic Speech Recognition and Understanding Workshop, 2001, pp. 288-291. [online] [Retrieved on Jan. 31, 2013], Retrieved from the internet: http://www1.se.cuhk.edu.hk/~hccl/publications/pub/Meng__ASRU2001_NLU.pdf.

Wu et al., "KIP: A Keyphrase Identification Program with Learning Functions" in Proceedings of the International Conference on Information Technology: Coding and Computing (ITCC'04), vol. 2, 5 pages, (2004).

Yaman et al., "An Integrative and Discriminative Technique for Spoken Utterance Classification" IEEE Transactions on Audio, Speech, and Language Processing, 16(6), 2008, pp. 1207-1214. [online] [Retrieved on Jan. 31, 2013], Retrieved from the internet: http://www1.icsi.berkeley.edu/~sibel/TASL-SUC.pdf.

\* cited by examiner

LATTICE SEMANTIC PARSING

BACKGROUND

This specification relates to speech recognition and speech understanding systems.

Speech recognition and speech processing systems are prevalent in many consumer electronic devices. Many of these electronic devices now utilize speech command processing techniques to converts speech to text, and to optionally invoke and perform particular operations. For example, a user device, such as a smart phone, can process speech commands to perform specified operations that include searching the web, setting an alarm, calling a particular person, and so on. Alternatively, the user device can convert speech to text and provide the text to a service external to the user device. The service then processes the text and performs specified operations.

One way of processing command inputs in the form of text is parsing. Systems utilize parsing rules developed for various commands a user will speak. Upon a successful parse of a command input by a rule, an action associated with the rule is performed (or may be performed subject to user confirmation).

SUMMARY

In general, one innovative aspect of the subject matter described in this specification can be embodied in methods that include the actions of receiving, by a data processing apparatus, lattice parse data describing a lattice parse of a command sentence having a plurality of terms, the lattice parse data defining a plurality of N nodes and edges connecting the N nodes, each respective edge corresponding to a respective term in the command input sentence and connecting a respective first node to a respective second node, wherein one of the first nodes is a source node having only one edge corresponding to a first term in the command sentence and one of the second nodes is a sink node; accessing, by the data processing apparatus, a plurality of parsing rules, each parsing rule defined by one or more constituent parse rules and each parsing rule associated with a particular action; for each of the parsing rules, determining lattice spans of two or more nodes that define corresponding term spans in the command sentence that are consumed by one or more constituent parse rules; for each parsing rule for which the determined lattice spans from the source node to the sink node of the lattice parse, selecting the parsing rule as a candidate parse of the command sentence; and determining, from the candidate parses of the command sentence, an action to be performed in response to the command sentence. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The system facilities the semantic parsing of command inputs according to a lattice data structure, which handles a potentially large number of possible outputs for an ambiguous speech input. Each path through the lattice is a hypothesis output, and a semantic parser parses lattice spans in the lattice, which results in parses of every possible command input encoded in the lattice to compete against each other.

The semantic parsing is done by the application of parsing rules to spans of two or more nodes in the lattice. The rules may be in the form of context free grammars. By selecting only parsing rules that successfully parse a lattice span from a source node to a sink node, only the grammars that successfully parse to a start symbol S root node can be used to determine whether a corresponding action is invoked.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A language processing system uses a lattice parser that semantically parses a command input represented by a lattice. The parser receives a hypotheses space of outputs as encoded in a lattice. Annotations of the input are projected back into the lattice and then lattice parsing is performed to rectify with the annotations. Parsing rules are applied to path fragments in the lattice. The rules that successfully parse from the start node to the end node of the lattice are used to determine whether the command input sentence invokes a specific action, and if so, what arguments are to be passed to the invocation of the action.

Operation of language processing system and the lattice semantic parsing is describe in more detail below.

Figure 1:
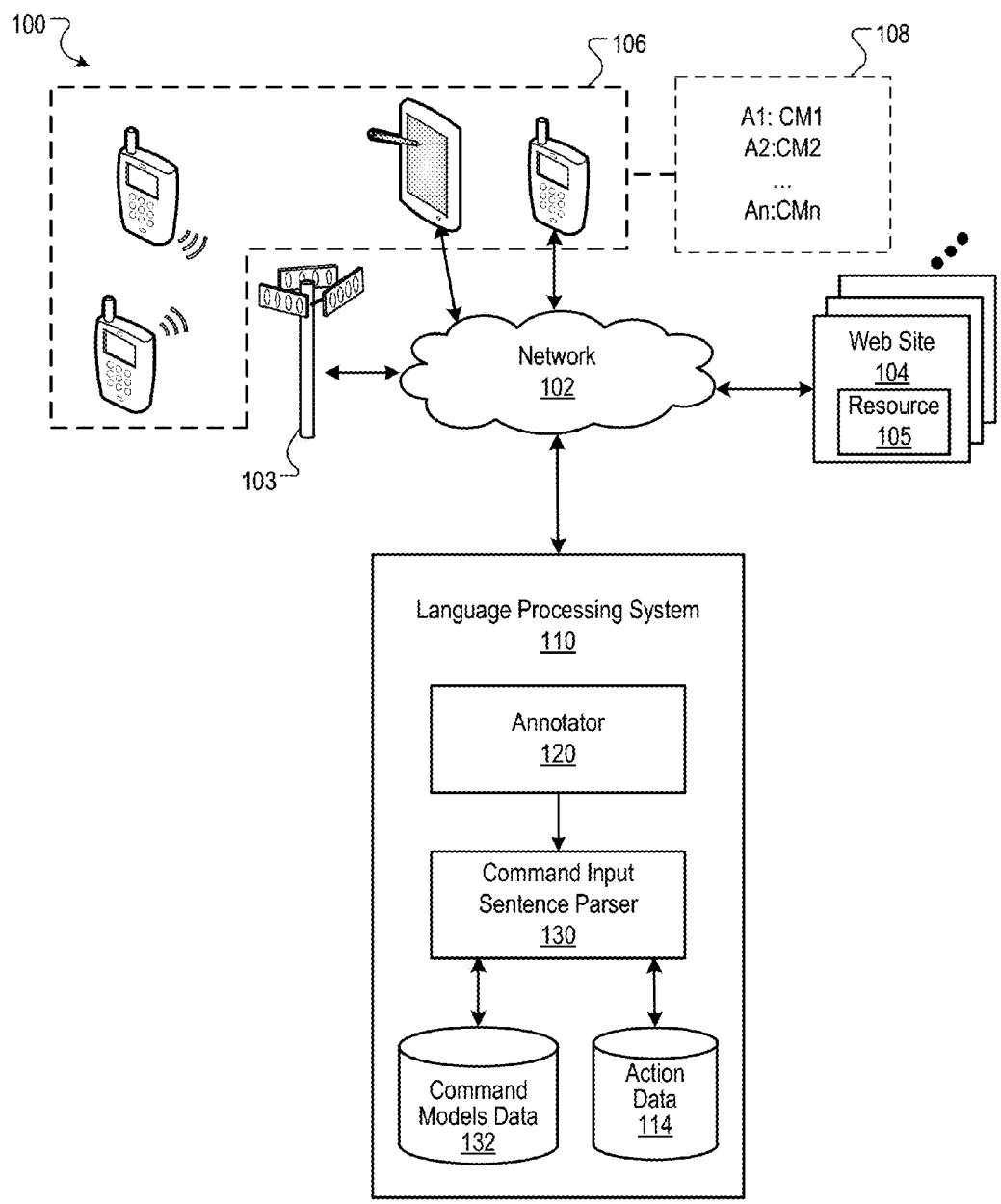
FIG. 1 is a block diagram of an environment in which lattice parsing is used to facilitate parsing initializations of command inputs.

FIG. 1 is a block diagram of an environment 100 in which lattice parsing is used to facilitate parsing initializations of command inputs. A computer network 102, such as a local area network (LAN), wide area network (WAN), the Internet, or a combination thereof, provides for data communication between electronic devices and systems. Examples of such electronic device and systems include web sites 104 and user devices 106. The computer network 102 may also be included, or be in data communication with, one or more wireless networks 103.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a content publisher, which is an entity that controls, manages and/or owns the website 104. A resource 105 is any data that can be provided by the website 104 over the network 102 and that is associated with a resource address.

A user device 106 is an electronic device that is under the control of a user and is capable of requesting and receiving resources over the network 102, establishing communication channels, e.g., voice communications, with other user devices 106, and also capable of performing other actions. Example user devices 106 include personal computers, mobile communication devices, and other devices that can send and receive data over the network 102. The user devices 106 may communicate over the networks 102 and 103 by means of wired and wireless connections with the networks 102 and 103.

A user device may be able to perform a set of device actions for various programs and capabilities. The actions may differ from each other for each action. For example, a telephone functionality may include the action placing a call in response to the commands of "call" or "phone," a particular contact, and may also include the action of "texting" the particular contact in response to the commands to "text" or "message" the particular contact; a calendar application may include the actions of "scheduling" a meeting or reminder in response to the command of "schedule," "accepting" or "declining" an invitation in response to the command to "accept" or "decline," the invitation; a mapping service may include the actions of "mapping" a location in response to the command to "map" a location; and so on. The actions may be performed entirely by the user device, e.g., in the case of placing a phone call, or the user device may invoke an external service to perform the action, e.g., a map service or a search engine service.

In some implementations, the user device 106 utilizes a voice recognition system that receives voice input, performs language recognition processing, and parses the resulting recognized words and phrases. The parsed words and phrases, which are referred to as n-grams, where each n-gram may constitute one or more words, are then processed to determine whether the voice input invokes a particular action. Alternatively, the user device 106 may perform only speech to text language processing, and provide the text to a language processing system external to the user device 106 and which then performs the remaining parsing operation.

As will be described in more detail below, each action A1, A2 . . . An has a corresponding command model CM1, CM2 . . . CMn, as indicated by the phantom box 108. The user device 106 (or a system external to the user device 106) utilizes the command models CMx to determine which, if any, actions are invoked in response to a voice input. As will be described in more detail the below, the command models are, in some implementations, grammars that describe sentence structures for particular commands. Other appropriate command models may also be used.

As used in this specification, an "input sentence," "command input" or simply a "sentence" can be two or more terms that are received as input. The input sentence does not need to be a grammatically correct and complete sentence, e.g., it need not have both a predicate and a subject. For example, the following input would constitute an input sentence, but would not constitute a grammatically complete sentence: "Images of lions."

In some implementations, a language processing system 110 is used to parse the command input sentence and determine which, if any action, is to be performed. As shown in FIG. 1, the language processing system 110 is separate from the user devices. However, the language processing system 110 can also be implemented within each user device.

The language processing system 110 receives command input sentences from user devices 106 and provides responsive data back to the user devices. Such responsive data may be, for example, a fully parsed sentence, the action invoked, and arguments to be passed to the service that performs the action.

The language processing system 110 includes command models data 132 that associates actions with corresponding command models by use of parsing rules, such as grammars.

The command models data 132 store command models for actions specified by action data 114, and can be provided by a service external to the language processing system 110. In some implementations, the command models are each configured to generate an action score for an action for an input sentence based on, for example, a semantic meaning of the input sentence. Example command models data 132 include context free grammars, which are described in more detail below. Other appropriate parsing models can also be used, however.

An example language processing system 110 includes an annotator 120 and a command input sentence parser 130. The example architecture is illustrative only, and other appropriate functional architectures can also be used. When the language processing system 110 receives an input sentence, the system 110 provides the command input sentence to the annotator 120. The annotator provide annotations in response, and the system 110 parses the input sentence using the annotations. The annotations identify entities in the input sentence and annotate the corresponding text identifying the entities. Such entities include persons, places, phone numbers, location coordinates, and the like. The annotations may, in some implementations, map to non-terminals of parsing rules.

Figure 2:
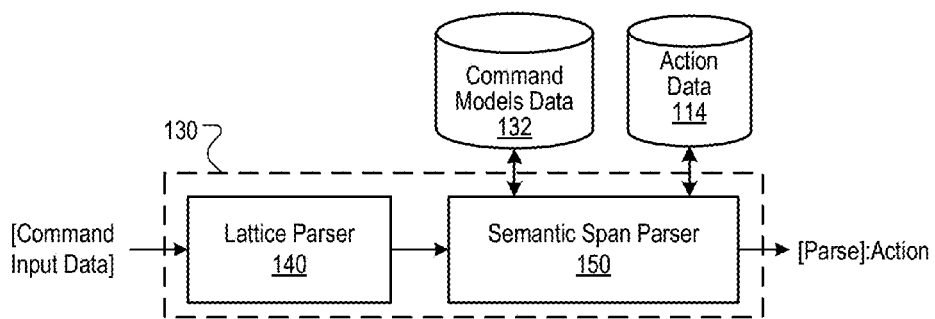
FIG. 2 is a more detailed block diagram of a command input sentence parser for parsing an input and determining a resulting action.
Figure 4:
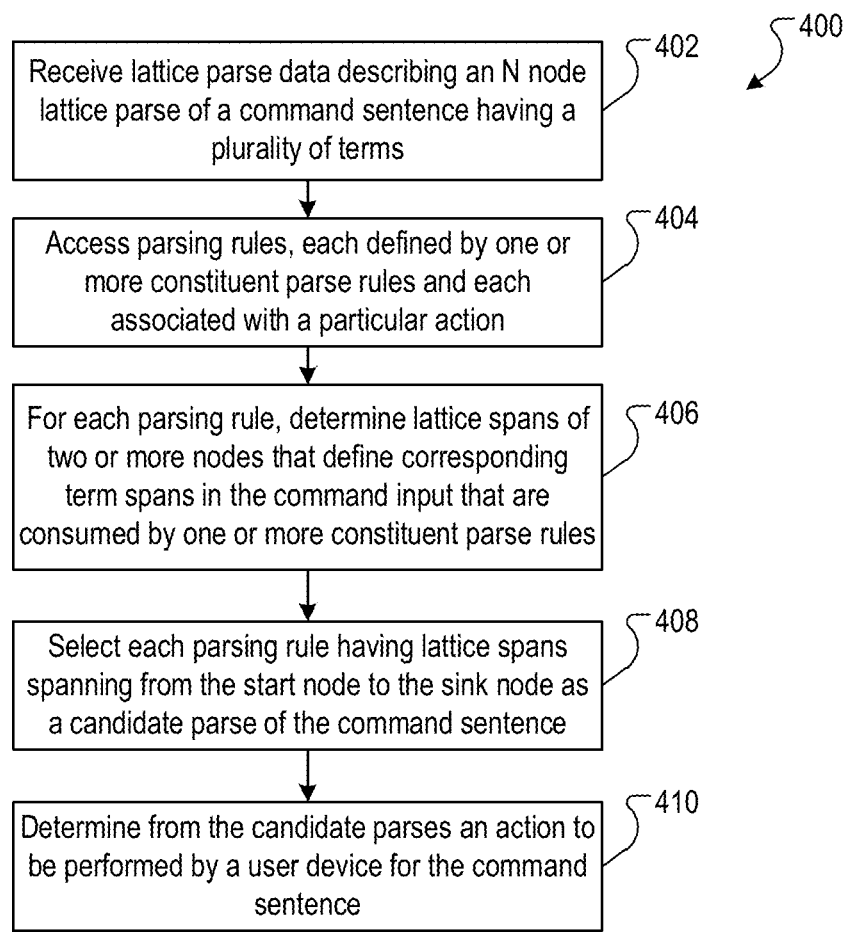
FIG. 4 is flow diagram of an example process for lattice semantic parsing.

The annotated command input is then provided to the command input sentence parser 130, which then parses the command input sentence using command models data. The parsing of the command input sentence is described in more detail with reference to FIG. 2, which is a more detailed block diagram of a command input sentence parser 130 for parsing an input and determining a resulting action, and with reference to FIG. 4, which is a flow diagram of an example process 400 for lattice semantic parsing.

In some implementations, the command input sentence parser 130 includes a lattice parser 140 and a semantic span parser 150. The lattice parser 140 can implement appropriate lattice parsing algorithms to generate a lattice that is representative of a hypothesis space for a command input. The lattice is a data structure having a set of nodes, with one node being a start (source) node and another node being an end (sink) node. The nodes are connected by edges, and each edge corresponds to a possible word recognized in the command input sentence by a speech-to-text analyzer. The nodes are topologically ordered so that any traversal from the source node to the sink node is a hypothesis, i.e., a possible command sentence output of the speech-to-text analyzer.

Figure 3:
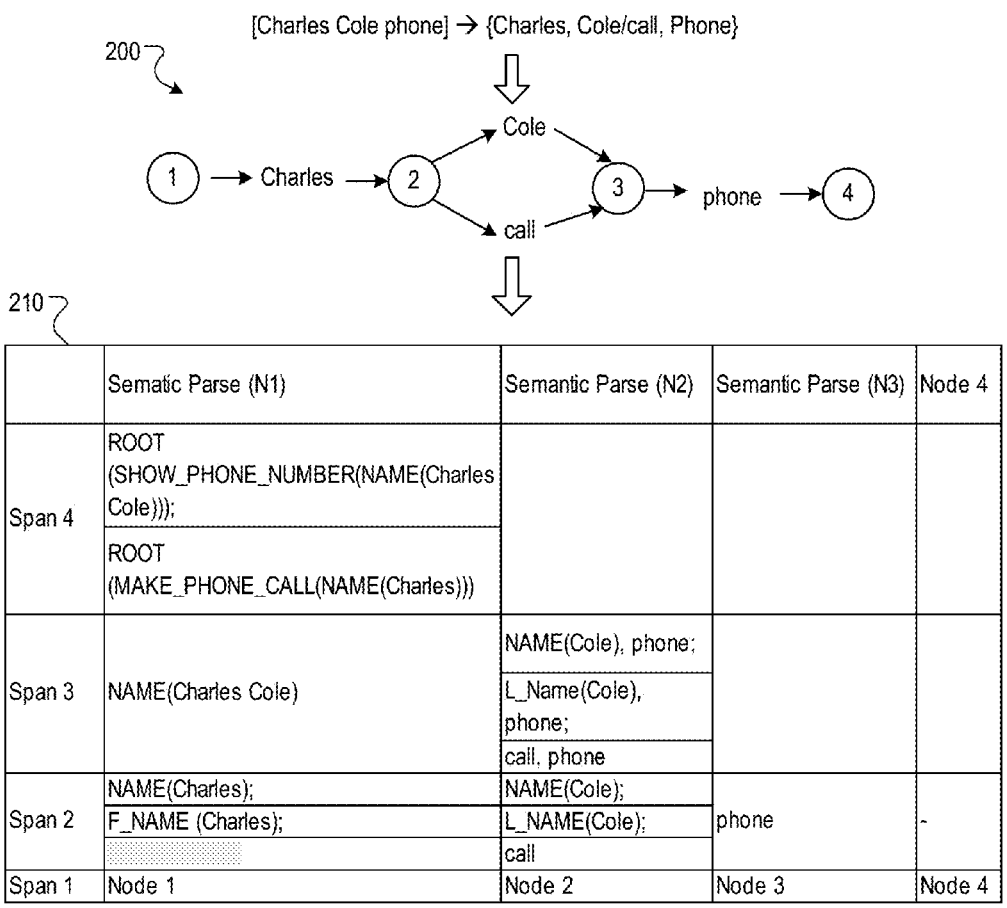
FIG. 3 is a matrix illustrating the results of a lattice semantic parse.

An example lattice for the voice input of [Charles Cole phone] is shown in FIG. 3. For this utterance, the speech-to-text identifies an ambiguity in resolving the input to either [Cole] or [call]. Thus, a lattice as shown in FIG. 3 is generated, defining a hypothesis space of two potential outputs:

[Charles Cole phone]

[Charles call phone]

Each edge can, in some implementations, be weighted with a confidence score, and the edge weights traversed from source to sink are used, in part, to generate a confidence score for the particular hypothesis.

Once the lattice is generated, it is provided to the semantic span parser 150, when then performs a semantic parsing on spans of the lattice for corresponding rules in the commands model data 132. In some implementations, a chart parse is used to track spans that have been covered, and each successful parse of a span results in the semantic yield of the parse populating the resulting chart. At the completion of the chart parse, the resulting semantic parses that span from the source node to sink node are the corresponding parse rules that successfully parse the command input. Scores are then determined for each parse rule that successfully parses the command input, and one of the parse rules is selected based on the scores. The action associated with the selection parse rule is then invoked.

The semantic span parser 150 implements the process 400, and its operation is described with respect to the lattice shown in FIG. 3. In the example that will be described, the semantic span parser utilized a bottom-up parsing approach; however, a top-down parsing approach can also be used.

The semantic span parser 150 receives lattice parse data describing an N node lattice parse of a command sentence having a plurality of terms (402). For example, for the lattice parse data defining N nodes and edges connecting the N nodes, each respective edge corresponds to a respective term in the command input sentence and connects a respective first node to a respective second node. As shown in FIG. 3, the lattice encodes two hypotheses.

The semantic span parser 150 accesses parsing rules, each defined by one or more constituent parse rules and each associated with a particular action (404). For example, assume the command models data have three rules that are associated with corresponding actions:

ROOT→NAME phone: (SHOW_PHONE_NUMBER ($1))
    ROOT→NAME call phone: (MAKE_PHONE_CALL ($1))
    ROOT→NAME call: (MAKE_PHONE_CALL($1))

The "ROOT" term is analogous to a start system S for a grammar. Following the each "ROOT" and before each colon is a portion of a grammar including non-terminals in all caps and terminals in regular case. Each non-terminal corresponds to an entity type that may parse into the non-terminal. For the example of FIG. 3, the non-terminal "NAME" is a name entity that consumes recognized names of persons during a parse.

Follow each colon an associated action is specified. The action "SHOW_PHONE_NUMBER($1)" causes a device to display a phone number for a contact, which is generally represented by the parameter $1. The action "MAKE_PHONE_CALL($1)" causes a device to place a phone call to phone number for a contact, which is again generally represented by the parameter $1.

The parsing rules may incorporate constituent rules. For example, for the non-terminal "NAME," any recognized first name or last name may map to the non-terminal name. Furthermore, however, another rule that combines a recognized first name and a recognized last name may also map to the non-terminal "NAME." An example set of constituent rules are thus:

NAME→F_NAME_L_NAME (COMBINE($1 $2))
    NAME→F_NAME ($1)
    NAME→L_NAME ($2)

The semantic span parser 150, for each parsing rule, determines lattice spans of two or more nodes that define corresponding term spans in the command input that are consumed by one or more constituent parse rules (406). In operation, the semantic span parser 150, for each parsing rule, incrementally determines lattice spans on increasing node lengths until one of a lattice span from the source node to the sink node or a failure to determine a lattice span from the source node to the sink node occurs. The semantic yield of each successfully parsed span is stored in a resulting chart. For example, in FIG. 3, the chart 210 is generated for the lattice and populated during the parsing of semantic spans.

The ordinal position of each column in the chart 210 represents the staring node of a span analysis, and the ordinal position of each row, beginning from the bottom, represents the length of a span being parsed. The bottom row generally can be ignored, as a span of one node does correspond to a particular span in the lattice.

Beginning at the row "Span 2", each node for each column is selected and the words for all spans of length two beginning at the node corresponding to the column is parsed. Thus, for the column corresponding to node N1, the only span is to node N2, resulting in "Charles" as a parse term. The rules "NAME" and "F_NAME" successfully parse "Charles," as this the term "Charles" has been annotated as a name entity.

For the column corresponding to node N2, two spans are available—N2 to N3, and N2 to N4, resulting in "Cole" and "call" as parse terms. The rules "NAME" and "L_NAME" successfully parse "Cole," as this the term "Cole" has been annotated as a name entity. Additionally, the term "call" successfully parses to the terminal "call" in the rules above.

For the column corresponding to node N3, one span is available—N3 to N4, resulting in the parse term "phone." The term "phone" successfully parses to the terminal "phone" in the rules above. Note, however, the any portion of the rule
    ROOT→NAME call: (MAKE_PHONE_CALL($1))
cannot successfully parse from node N3 to N4, as the parse rule does not account for the non-terminal "phone." Accordingly, no hypothesis in the hypothesis space of the lattice can be successfully parsed by this particular parse rule.

Finally, for the column corresponding to the sink node N4, no span can be made, as doing so would extended beyond the sink node.

Because parse rules still remain to be processed (i.e., not all of the parse rules have been eliminated for failing to successfully parse to a hypothesis), the span length is incremented to a length of three, and the parsing begins again at the first node N1. For this node, two spans are now available in the span N1-N2-N3. The resulting semantic yields of "NAME (Charles Cole)" and "NAME(Charles), call" thus populate the chart based on the constituent parses in the subspans in the row of Span 2.

For the span beginning at node N2, two spans are again available in the span N2-N3-N4. The resulting semantic yields of "NAME(Cole), phone", "L_NAME(Cole), phone" and "call, phone" thus populate the chart based on the constituent parse in the subspans in the row of Span 2.

Finally, for the column corresponding to node N3, no span can be made, as doing so would extended beyond the sink node N4.

The span length is again incremented to a length of four. For the only available node, N1, the two remain parsing rules successfully parse lattice spans from the start node N1 to the sink node N4. Accordingly, the semantic yield of both of these parsing rules populate the first cell in the top row of the chart 210.

The semantic span parser 150 selects each parsing rule having lattice spans from the start node to the sink node as a candidate parse of the command sentence (408). As illustrated in chart 210, the following two rules are selected as candidate parses:

ROOT→NAME phone: (SHOW_PHONE_NUMBER (Charles Cole))
    ROOT→NAME call phone: (MAKE_PHONE_CALL (Charles))

The semantic span parser 150 determines from the candidate parses an action to be performed by a user device for the command sentence (410). For example, the semantic span parser 150 can generate a lattice parse score for each lattice span, and for each span from source to sink the constituent lattice scores for the span are taken into account to generate an action score for the candidate parse that successfully parses the span. The lattice parse score can, for example, be based the edge weights of each edge traversed in the span that corresponds to the recorded semantic yield. To illustrate, assume in the example above a speech-to-text confidence score that measure the confidence of an accurate conversion of a term to text is recorded for each term. For the term "Cole" the score is 0.73, and for the term "call" the score is 0.27. Based only on these scores, the action "SHOW_PHONE_NUMBER(Charles Cole)" would be invoked, as the term "Cole" has a higher confidence that "call." Additional scoring techniques can also be used to determine the action score.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by a data processing apparatus, the method comprising:

receiving, by a data processing apparatus, lattice parse data describing a lattice parse of a command sentence input at a user device as a voice command input sentence and converted to a plurality of terms, the lattice parse data defining a plurality of N nodes and edges connecting the N nodes, each respective edge corresponding to a respective term in the command sentence and connecting a respective first node to a respective second node, wherein one of the first nodes is a source node having only one edge corresponding to a first term in the command sentence and one of the second nodes is a sink node;

annotating each respective term of an edge as one of a terminal or a non-terminal;

accessing, by the data processing apparatus, a plurality of parsing rules, each parsing rule defined by one or more constituent parsing rules and each parsing rule associated with a particular action, wherein at least some of the paring rules include constituent parsing rules that include non-terminals, and wherein each particular action is an action to be taken by the user device in response to a successful parse of a command sentence by the parsing rule;

for each of the parsing rules, determining lattice spans of two or more nodes that define corresponding term spans in the command sentence that are consumed by one or more constituent parsing rules;

for each parsing rule for which the determined lattice spans from the source node to the sink node of the lattice parse, selecting the parsing rule as a candidate parse of the command sentence;

determining, from the candidate parses of the command sentence, an action to be performed in response to the command sentence; and causing the determined action to be performed.

2. The computer-implemented method of claim 1, wherein for each of the parsing rules, determining lattice spans of two or more nodes that define corresponding term spans in the command sentence that are consumed by one or more constituent parsing rules comprises incrementally determining lattice spans on increasing node lengths until one of a lattice span from the source node to the sink node or a failure determine a lattice span from the source node to the sink node occurs.

3. The computer-implemented method of claim 2, wherein determining, from the candidate parses of the command sentence, an action to be performed in response to the command sentence comprises:

for each candidate parse, generating an action score for the parse; and selecting the particular action associated with the candidate parse having a highest action score relative to the actions scores for the other candidate parses.

4. The computer-implemented method of claim 3, wherein generating an action score for a candidate parse comprises:
for each lattice span determined for a candidate parse, determining a lattice parse score; and
determining the action score for the candidate parse based on the lattice parse scores.

5. The computer-implemented method of claim 4, wherein determining a lattice parse score comprises determining a score that measures a confidence of a voice to text translation of terms to which the lattice parse corresponds.

6. The computer-implemented method of claim 1, wherein determining, from the candidate parses of the command sentence, an action to be performed in response to the command sentence comprises:
for each candidate parse, generating an action score for the parse; and
selecting the particular action associated with the candidate parse having a highest action score relative to the actions scores for the other candidate parses.

7. The computer-implemented method of claim 1, wherein each parsing rule is a grammar defining one or more non-terminals and terminals, each non-terminal being of one of a plurality of entity types.

8. A non-transitory computer readable storage medium storing instructions executable by a data processing apparatus and that upon such execution causes the data processing apparatus to perform operations comprising:
receiving, by a data processing apparatus, lattice parse data describing a lattice parse of a command sentence input at a user device as a voice command input sentence and converted to a plurality of terms, the lattice parse data defining a plurality of N nodes and edges connecting the N nodes, each respective edge corresponding to a respective term in the command sentence and connecting a respective first node to a respective second node, wherein one of the first nodes is a source node having only one edge corresponding to a first term in the command sentence and one of the second nodes is a sink node;
annotating each respective term of an edge as one of a terminal or a non-terminal;
accessing, by the data processing apparatus, a plurality of parsing rules, each parsing rule defined by one or more constituent parsing rules and each parsing rule associated with a particular action, wherein at least some of the paring rules include constituent parsing rules that include non-terminals, and wherein each particular action is an action to be taken by the user device in response to a successful parse of a command sentence by the parsing rule;
for each of the parsing rules, determining lattice spans of two or more nodes that define corresponding term spans in the command sentence that are consumed by one or more constituent parsing rules;
for each parsing rule for which the determined lattice spans from the source node to the sink node of the lattice parse, selecting the parsing rule as a candidate parse of the command sentence;
determining, from the candidate parses of the command sentence, an action to be performed in response to the command sentence; and
causing the determined action to be performed.

9. The non-transitory computer readable storage medium of claim 8, wherein for each of the parsing rules, determining lattice spans of two or more nodes that define corresponding term spans in the command sentence that are consumed by one or more constituent parsing rules comprises incrementally determining lattice spans on increasing node lengths until one of a lattice span from the source node to the sink node or a failure determine a lattice span from the source node to the sink node occurs.

10. The non-transitory computer readable storage medium of claim 9, wherein determining, from the candidate parses of the command sentence, an action to be performed in response to the command sentence comprises:
for each candidate parse, generating an action score for the parse; and
selecting the particular action associated with the candidate parse having a highest action score relative to the actions scores for the other candidate parses.

11. The non-transitory computer readable storage medium of claim 10, wherein generating an action score for a candidate parse comprises:
for each lattice span determined for a candidate parse, determining a lattice parse score; and
determining the action score for the candidate parse based on the lattice parse scores.

12. The non-transitory computer readable storage medium of claim 11, wherein determining a lattice parse score comprises determining a score that measures a confidence of a voice to text translation of terms to which the lattice parse corresponds.

13. The non-transitory computer readable storage medium of claim 8, wherein determining, from the candidate parses of the command sentence, an action to be performed in response to the command sentence comprises:
for each candidate parse, generating an action score for the parse; and
selecting the particular action associated with the candidate parse having a highest action score relative to the actions scores for the other candidate parses.

14. The non-transitory computer readable storage medium of claim 8, wherein each parsing rule is a grammar defining one or more non-terminals and terminals, each non-terminal being of one of a plurality of entity types.

15. A system, comprising:
a data processing apparatus; and
a non-transitory computer readable storage medium in data communication with the data processing apparatus storing instructions executable by the data processing apparatus and that upon such execution causes the data processing apparatus to perform operations comprising:
data processing apparatus to perform operations comprising:
receiving, by a data processing apparatus, lattice parse data describing a lattice parse of a command sentence input at a user device as a voice command input sentence and converted to a plurality of terms, the lattice parse data defining a plurality of N nodes and edges connecting the N nodes, each respective edge corresponding to a respective term in the command sentence and connecting a respective first node to a respective second node, wherein one of the first nodes is a source node having only one edge corresponding to a first term in the command sentence and one of the second nodes is a sink node;
annotating each respective term of an edge as one of a terminal or a non-terminal;
accessing, by the data processing apparatus, a plurality of parsing rules, each parsing rule defined by one or more constituent parsing rules and each parsing rule associated with a particular action, wherein at least some of the paring rules include constituent parsing rules that include non-terminals, and wherein each particular action is an action to be taken by the user device in response to a successful parse of a command sentence by the parsing rule;

for each of the parsing rules, determining lattice spans of two or more nodes that define corresponding term spans in the command sentence that are consumed by one or more constituent parsing rules;

for each parsing rule for which the determined lattice spans from the source node to the sink node of the lattice parse, selecting the parsing rule as a candidate parse of the command sentence;

determining, from the candidate parses of the command sentence, an action to be performed in response to the command sentence; and causing the determined action to be performed.

\* \* \* \* \*